(12) United States Patent
Taipale

(10) Patent No.: US 7,067,174 B2
(45) Date of Patent: Jun. 27, 2006

(54) SELF-ADHESIVE LABELSTOCK, A FACE PAPER FOR SELF-ADHESIVE LABELSTOCK, A PRINT CARRIER AND A METHOD FOR MAKING THE FACE PAPER AND THE PRINT CARRIER FOR SELF-ADHESIVE LABELSTOCK

(75) Inventor: Jyrki Taipale, Tampere (FI)

(73) Assignee: UPM-Kymmene Corporation (FI)

( * ) Notice: Subject to any disclaimer, the term of this patent is extended or adjusted under 35 U.S.C. 154(b) by 130 days.

(21) Appl. No.: 10/662,829

(22) Filed: Sep. 15, 2003

(65) Prior Publication Data

US 2004/0062923 A1 Apr. 1, 2004

Related U.S. Application Data

(63) Continuation of application No. 09/904,441, filed on Jul. 12, 2001, now abandoned, which is a continuation of application No. PCT/FI99/01011, filed on Dec. 7, 1999.

(30) Foreign Application Priority Data

Jan. 19, 1999 (FI) .................................... 990105

(51) Int. Cl.
 *C09J 7/02* (2006.01)
(52) U.S. Cl. .................. 427/207.1; 428/41.8; 428/343; 428/354; 428/40.1; 428/511; 428/537.5
(58) Field of Classification Search ............ 428/40.1, 428/41.8, 343, 354, 511, 537.5; 427/207.1
See application file for complete search history.

(56) References Cited

U.S. PATENT DOCUMENTS

| 4,258,092 | A  | * | 3/1981  | Labar ........................... 428/40    |
| 5,370,420 | A  | * | 12/1994 | Khatib et al. .................. 283/81    |
| 5,543,191 | A  | * | 8/1996  | Dronzek, Jr. et al. ...... 428/41.5 |
| 5,691,022 | A  | * | 11/1997 | Knauf ........................ 428/40.1   |
| 6,182,572 | B1 | * | 2/2001  | McKillip .................... 101/494    |
| 2002/0048674 | A1 | * | 4/2002 | Taipale ....................... 428/343   |

FOREIGN PATENT DOCUMENTS

| DE | 19706574 A1 | * | 8/1998  |
| EP | 0767273 A1  | * | 9/1996  |
| JP | 55129475    |   | 10/1980 |
| JP | 2014100     |   | 1/1990  |
| JP | 3213600     |   | 9/1991  |
| JP | 216456/1997 |   | 8/1997  |
| JP | 11001897    |   | 1/1999  |

\* cited by examiner

*Primary Examiner*—Daniel Zirker
(74) *Attorney, Agent, or Firm*—Fitch, Even, Tabin & Flannery

(57) ABSTRACT

A self-adhesive labelstock comprises a face paper that has an adhesive layer formed on its one side. The face paper is finished in contact over a long distance with a smooth, hot drying surface, which finishes the smoothness of the paper, such as a Yankee cylinder or a Condebelt dryer. The face paper is suitable for printing by many different printing methods.

4 Claims, 1 Drawing Sheet

Figure 1:
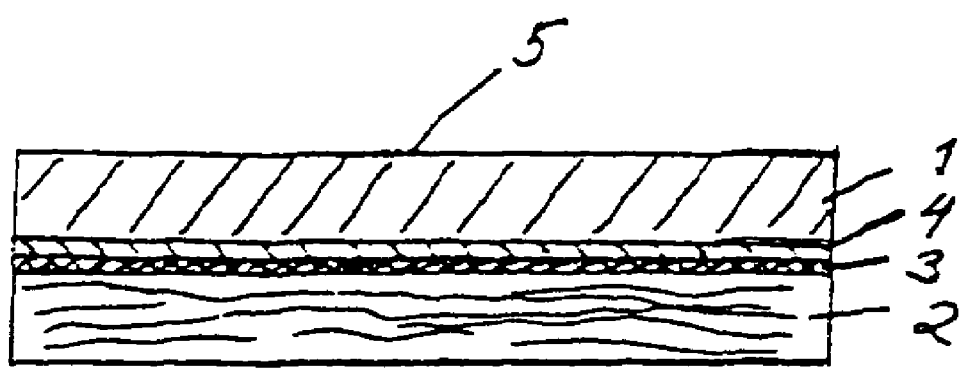

SELF-ADHESIVE LABELSTOCK, A FACE PAPER FOR SELF-ADHESIVE LABELSTOCK, A PRINT CARRIER AND A METHOD FOR MAKING THE FACE PAPER AND THE PRINT CARRIER FOR SELF-ADHESIVE LABELSTOCK

This is a continuation of prior application Ser. No. 09/904,441, filed Jul. 12, 2001, now abandoned, which is hereby incorporated herein by reference in its entirety, and which is a continuation of PCT/FI99/01011, filed Dec. 7, 1999.

This invention relates to a self-adhesive labelstock, a face paper for self-adhesive labelstock, a print carrier and a method for making the face paper and the print carrier for self-adhesive labelstock. The self-adhesive labelstock includes the face paper, which has an adhesive layer formed on its one side, and with the help of the said adhesive layer, the paper can be attached to a desired surface. Text and/or figures can be printed on the face paper using different printing methods. The paper-based print carrier has the function of being suitable for printing by different printing methods.

Normally, the face paper for the self-adhesive labelstock is multicylinder-dried paper that is coated or sized and heavily calendered. The surface deviations of the calendered paper are both towards and away from the structure, so the surface is relatively uneven.

Known self-adhesive labelstocks, on which text and/or figures can be printed, are disclosed e.g. in patents U.S. Pat. No. 5,370,420 and U.S. Pat. No. 5,543,191.

The aim of coating the base paper is to produce good printing quality. Cast coated printing papers are known e.g. from a German Patent Specification DE-19706574 and a European Patent Specification EP-767273.

The problem with known self-adhesive labelstocks, and paper-based print carriers in general, is that the same product is not suitable for different printing methods, and several products are needed for the desired printing methods to be used. Especially so-called post-printing, which means printing prices and other varying information after the printing proper, cannot be done with different printing methods on a single label grade. The print obtained is required to have such qualities as sharpness of characters and good contrast, which is especially important when printing e.g. bar codes. As a consequence of this, several coated papers have been created in order to optimise the properties of the coating for a certain printing method.

What is common to the demands of different printing methods is that the standard of the properties must always remain the same and the range of variation must be narrow. However, in order to achieve a good result, different printing methods require the face paper to have different properties. The following shows some examples of the requirements placed on paper by so-called nip printing:

The important parameters required of the paper in connection with ink jet printing include:
absorption rate
formation
chemical surface properties
surface energy
roughness volume
pore volume When using electrophotography or other dye-based methods, important parameters are e.g.:
contact surface
roughness
surface energy
formation Using the heat transfer method, the paper is required to have e.g. the following properties:
contact surface
smoothness
formation
surface energy The object of the invention is to present a paper suitable for printing almost equally well by all known printing methods, whereby raw materials can be saved.

A print carrier according to the invention, such as a face paper for self-adhesive labelstock, meets the requirements placed on paper by the printing methods in such a way that good printing results are obtained with several different nip printing methods.

The main characteristics of the product according to the invention are described in the 1st characterising part of the patent claims below.

The invention is based on the surprising observation that paper made of chemical pulp which paper has been dried by pressing it over a long distance against a smooth surface, is suitable for many printing methods: flexographic, letterpress, offset, screen, ink jet and heat transfer printing, electrophotography, ionography and magnetography.

A print carrier according to the invention, such as a face paper for self-adhesive labelstock, can be dried either with a Yankee Cylinder or with a Condebelt dryer. The advantage of Yankee and Condebelt drying processes is that the contact surface for printing is smoother and the physical and chemical deviations are smaller than those of a multicylinder dried, uncoated paper calendered to an equal surface smoothness. Paper dried with a Yankee cylinder can also be called MG (machine glazed) paper. When the fibre beating rate used for paper manufacture is optimal (SR 20–40), and when the wet web made from this fibre is pressed against a hot smooth surface, the contact surface of the fibre mesh dries to match the smoothness and form of the hot smooth surface. In the direction away from this dried contact surface into the inner layer of the paper there are pits, which arise due to the nature of the fibre mesh, the size, number and uniformity of which pits can be matched with the requirements of different printing methods. The surface of paper manufactured in this way can be further improved by means of light surface sizing. An advantageous characteristic of the paper surface is its very stable cationic surface charge, which makes the results of printing with anionic inks excellent. The dimensional stability, smoothness and gloss of MG paper and Condelbelt paper are good. Furthermore, the paper has a lower density and a higher porosity than calendered paper with an equally smooth surface. The smooth surface of the paper forms a plane, from which all roughness deviations are downwards into the paper structure. Therefore, a self-adhesive labelstock according to the invention can be used when printing by different printing methods, whereby the need for various types of labelstock is substantially eliminated.

The self-adhesive labelstock according to the invention and its manufacture are explained in greater detail in the following, with reference to the accompanying drawing, where FIG. 1 illustrates in principle a cross section of a self-adhesive labelstock (for purposes of illustration, the drawing is not true to scale).

As shown in FIG. 1, the self-adhesive labelstock comprises a face paper (1), a base paper (2), a release layer (3) and an adhesive layer (4). Text and/or figures can be printed on one surface (5) of the face paper using different printing methods.

The face paper is uncoated paper produced by the sulphate or sulphite process, which paper may have been treated in a surface sizing unit, and whose surface is processed either with a Yankee cylinder or with a Condebelt dryer. The grammage of the paper is 40–90 g/m$^2$.

A Yankee cylinder is a cast iron cylinder, which has a diameter of about 4–7 meters. Hot steam is fed into the Yankee cylinder at a pressure of 4–7 bars in order to dry the paper. The wet paper is pressed against the surface of the cylinder at a nip pressure of 60–120 kN/m, which is achieved when an impression roller is pressed against the Yankee cylinder in such a way that the paper remains between the Yankee cylinder and the impression roller, which are arranged to rotate. The paper adheres to the surface of the cylinder and dries, maintaining its planar dimensions. The surface of the cylinder is mirror-smooth and the side of the paper pressed against it will have similar smoothness and gloss as the cylinder surface. To enhance the drying process, the cylinder is covered with a hood and inside the hood hot air is blown onto the paper surface.

A Condebelt dryer consists of two endless rotating metal bands, which are smooth and impermeable to air, and one or more drying wires between the bands. The upper band can be heated and the lower one can be cooled. The width of the bands exceeds the width of the paper that is fed between them. When the wet paper is pressed between the metal bands in such a way that one side is in contact with the heated metal band, the water starts to evaporate and it condenses on the lower metal band. To prevent the paper from getting wet again, there are usually one or two drying wires above the lower metal band. In the case where there are two wires, the surface in contact with the paper is smooth and the wire against the lower metal band is rough. The surface of the paper obtained with a Condebelt dryer is very similar to that obtained with a Yankee cylinder. Common to both methods is that the paper is dried in contact over a long distance with the same smooth metal surface. The paper's dry surface which has been in drying contact is uniformly smooth, and the roughness, i.e. the small "pits" in the surface, whose size and number is determined by the beating rate, are beneath the smooth surface.

A surface of the paper dried in contact with one of the previously mentioned smooth surfaces, forms the outer surface 5 of the face paper of the self-adhesive labelstock, which surface can then be printed.

Next, a method of producing the self-adhesive labelstock will be described by way of an example, which method does not constitute a restriction to the scope of the invention.

When a self-adhesive labelstock is made, the face paper and the base paper are brought to the production line in rolls of pre-determined width and length. The base paper is first coated with a silicone layer in a roll coating unit. The layer is then polymerised and hardened at 140° C. in a tubular furnace. Silicone is spread at about 1 g/m$^2$.

Next, the base paper is coated with an adhesive layer on its siliconised side. Usually, the adhesive is a water-based dispersion, from which excess water is evaporated in a dryer. After drying, the web goes through a dampening unit to obtain a suitable level of moisture content.

The face paper and the base paper are laminated together by running them through rollers, which press the two layers together. The resulting laminate is then wound into a roll.

The laminate is further converted on a printing machine, which prints the labels, die-cuts them into suitable sizes, and removes any extra material. The printing method is determined by the characteristics required of the text and/or figures on the self-adhesive labelstock, and the application of the product. After printing proper, the label will be post-printed, when e.g. a bar code for product and price information etc. is added. The laminate is die-cut so that labels are formed, and the die-cut laminate is run through two rollers opposite each other, so that the extra material is passed after the rollers Onto one cylinder and the labels onto the other cylinder.

It is clear to one skilled in the art that many different variations and adaptations of the present invention fall within the scope of the claims presented below. For example, the self-adhesive labelstock need not have a base paper, but the labels can e.g. be attached to one another. The adhesive on the back of the face paper can also be other than a water-based dispersion, e.g. a hot-melt adhesive or a solvent-based adhesive. Likewise, a self-adhesive labelstock can refer to a non-printed product, whose face paper will be printed at a later stage, or to an at least partially printed product, which already has a print on the face paper. Technical translation Fin-En/RM.

What is claimed is:

1. A method for making a self-adhesive labelstock, the method comprising:
   contacting wet paper made with pulp comprising chemical pulp with a smooth, hot surface for a time and temperature which is effective for providing an outer surface of the face paper with a finished surface for printing, the face paper also having an inner surface opposite the outer surface;
   coating a releasable base layer with a release coating to provide a release coated base layer;
   applying an adhesive to the release coating on the release coated base layer; and
   laminating the adhesive coated side of the base layer to the inner surface of the face paper.

2. The method for making a self-adhesive labelstock according to claim 1, wherein the face paper is uncoated paper.

3. for making a self-adhesive labelstock according to claim 1 wherein the smooth hot surface is provided by a Yankee cylinder.

4. The for making a self-adhesive labelstock according to claim 1, wherein the smooth hot surface is provided by a Condebelt dryer.

* * * * *